United States Patent [19]
Brendzel et al.

[11] Patent Number: 5,859,901
[45] Date of Patent: Jan. 12, 1999

[54] INTELLIGENT CALL CONNECTION SERVICE

[75] Inventors: Henry Tzvi Brendzel, Millburn; Roy Philip Weber, Bridgewater, both of N.J.

[73] Assignee: AT&T Corp., Middletown, N.J.

[21] Appl. No.: 812,867

[22] Filed: Mar. 6, 1997

[51] Int. Cl.⁶ .................................................. H04M 15/00
[52] U.S. Cl. .......................... 379/114; 379/121; 379/220; 379/355
[58] Field of Search .................................. 379/112, 114, 379/118, 120, 121, 125, 127, 134, 144, 173, 183, 196, 198, 197, 212, 219, 220, 221, 222, 242, 243, 245, 216, 355, 356

[56] References Cited

U.S. PATENT DOCUMENTS

| | | |
|---|---|---|
| 4,600,812 | 7/1986 | Gerlits . |
| 4,757,267 | 7/1988 | Riskin .................................... 379/219 |
| 5,157,719 | 10/1992 | Waldman ................................ 379/356 |
| 5,533,107 | 7/1996 | Irwin et al. ............................. 379/127 |
| 5,696,816 | 12/1997 | Sonnenberg ............................ 379/220 |

FOREIGN PATENT DOCUMENTS

| | | |
|---|---|---|
| 0 219 771 A | 4/1987 | European Pat. Off. . |
| 0 557 643 A2 | 9/1993 | European Pat. Off. . |
| 0 631 418 A1 | 12/1994 | European Pat. Off. . |
| WO 95 23486 A | 8/1995 | WIPO . |

*Primary Examiner*—Curtis A. Kuntz
*Assistant Examiner*—Binh K. Tieu

[57] ABSTRACT

The number of times that a subscriber is forced to add an area code to his or her dialing sequence is substantially reduced by allowing calling parties to dial without including the area code, by analyzing the called party number relative to the calling party, and by resolving ambiguities in the called number based on that analysis. The analysis includes, but is not limited to, taking account of the calling pattern of the calling subscriber, and taking account of the distance between the calling and the called parties.

19 Claims, 2 Drawing Sheets

INTELLIGENT CALL CONNECTION SERVICE

TECHNICAL FIELD

This invention relates to telecommunication switching, and more particularly to an intelligent call connection service.

BACKGROUND

The telecommunication numbering plan in the US divides the country into area codes and includes within each area code a plurality of central office exchanges. The exchanges cover geographical subareas of the area codes, and each exchange serves a number of subscribers. The maximum number of subscribers that an exchange can serve is limited by the number of digits that define a subscriber within an exchange which, in the US is 10,000. When the subareas covered by exchanges are built up to approach 10,000 subscribers, additional exchanges must be added, and they are typically added without regard to whether the geographical subarea of one exchange overlaps in whole or in part the geographical subarea of another exchange. What is diligently maintained, however, is that an exchange should not straddle more than one area code. This restriction is imposed so that telephone companies can include identically identified exchanges in adjacent area codes without creating ambiguities. Actually, the ambiguity is avoided by requiring customers to dial an area code prior to dialing the exchange when customers wish to reach parties outside their area codes. Since, at least traditionally, customers called within their area code much more than outside their area code ("long distance"), avoiding the requirement to specify the area code was an appreciated feature.

The burgeoning number of cellular telephones and the increase in the number of homes with a multiple number of telephone lines (for fax service, telecommuting, etc.) is causing the local telephone companies to reduce the geographical size of area codes and to increase their number. Consequently, people are increasingly forced to include the area code in their dialing digit sequence even when dialing a number that is geographically very close. While this is not a new problem; it is being exacerbated with the increase in the number of area codes.

An arrangement that eliminates, or reduces, the number of times that subscribers need to include the area code when dialing would be very beneficial.

SUMMARY

In accordance with the principles disclosed herein, the number of times that a subscriber is forced to add an area code to his or her dialing sequence is substantially reduced by allowing calling parties to dial without including the area code, by analyzing the called party number relative to the calling party, and by resolving ambiguities in the called number based on that analysis. This analysis includes, but is not limited to, taking account of the calling pattern of the calling subscriber, and taking account of the distance between the calling and the called parties.

DETAILED DESCRIPTION

As indicated above, the current dialing arrangement in the US allows subscribers to dial a number without specifying the area code. When so dialed, the telecommunication switch that receives the dialed digits assumes that the dialed number is within the area code, and connects the call accordingly. If the dialed exchange does not exist in the local area code, an error message is delivered to the calling subscriber.

In accordance with the principles disclosed herein, the modus operandi is changed so that when a customer dials a number without specifying an area code, the number is analyzed vis-à-vis the subscriber, and the connection process responds to the analysis.

When database resources are available, the analysis first looks at the calling history of the calling party. Thereafter, and perhaps regardless of whether database resources are available, the analysis evaluates the physical distance between the calling subscriber and parties that have a number which corresponds to the dialed number.

Figure 1:
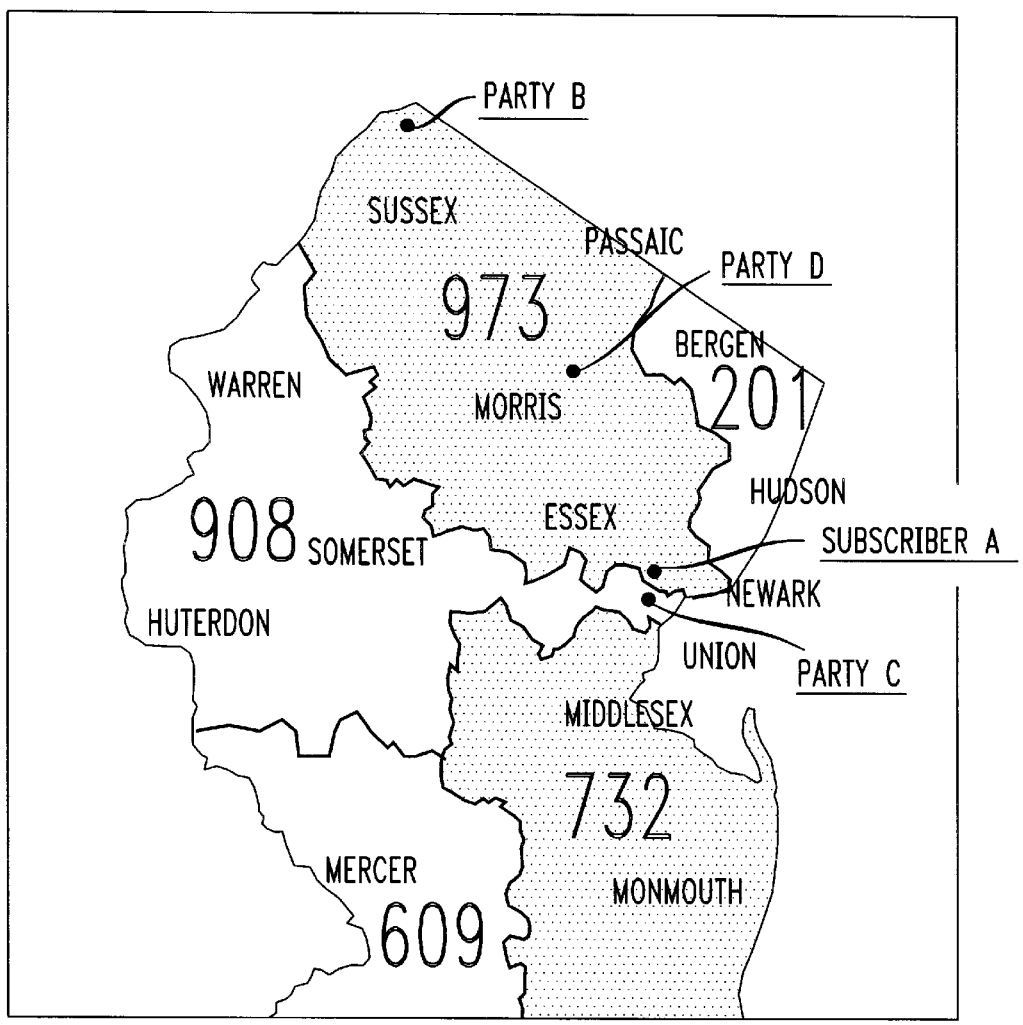
FIG. 1 shows a map approximating the area codes for northern New Jersey.

For example, FIG. 1 presents a roughly drawn map of the area codes for Northern New Jersey, as they were proposed late in 1996. According to FIG. 1, a subscriber A in Essex County may call parties to its north, such as party B in Sussex County (which may be more than an hour's drive away), without having to include an area code. However, to call party C which is two blocks away in Union County, subscriber A is required to include the area code in the dialing sequence. While, strictly speaking, the telephone company is correct in considering the potential ambiguity between party C and a possible party D which has the same 7 digits as party C and is in the area code of subscriber A, in reality the probability of confusion is very small. First, even without any information at all about the identity of subscriber A and parties C and D, the probability that subscriber A wishes to be connected to party C and not to party D is quite high if party C is geographically much closer to subscriber A than party D is. Secondly, information is available about party C relative to subscriber A if subscriber A has called party C in the past, and that substantially raises the likelihood that party C is again being called. For example, party C may be the family doctor of subscriber A and therefore even a cursory look at the calling pattern of subscriber A will quickly reveal that, in most likelihood, when subscriber A dials the 7 digits that correspond to parties C and D, the intended called party is party C (in a foreign area code) and not party D (in the local area code).

Thus, in accordance with the principles disclosed herein, both calling patterns and distances can be used to release subscribers from the obligation to include an area code in their dialing sequence.

For purposes of the calling patter analysis, the telephone central office maintains a small database (i.e, a table) for subscriber A. (This database can also be in a central Network Control Processor (NCP), or in a PBX—if subscriber A is behind a PBX.) Each entry in the table illustratively has the format

| area code | number | weight | date of last access |
|---|---|---|---| and the table entries are segregated into portions A, B, and C. Portion A includes parties specified by subscriber A, portion B includes parties where the associated weight is the controlling element (as described in more detail below), and portion C includes parties where the date field is important (also described below). Thus, the database for subscriber A may include, for example, 10 numbers specified by subscriber A, 20 other different numbers that were dialed more often than all other numbers, and a maximum of 20 other numbers that were dialed in the last three days.

Figure 2:
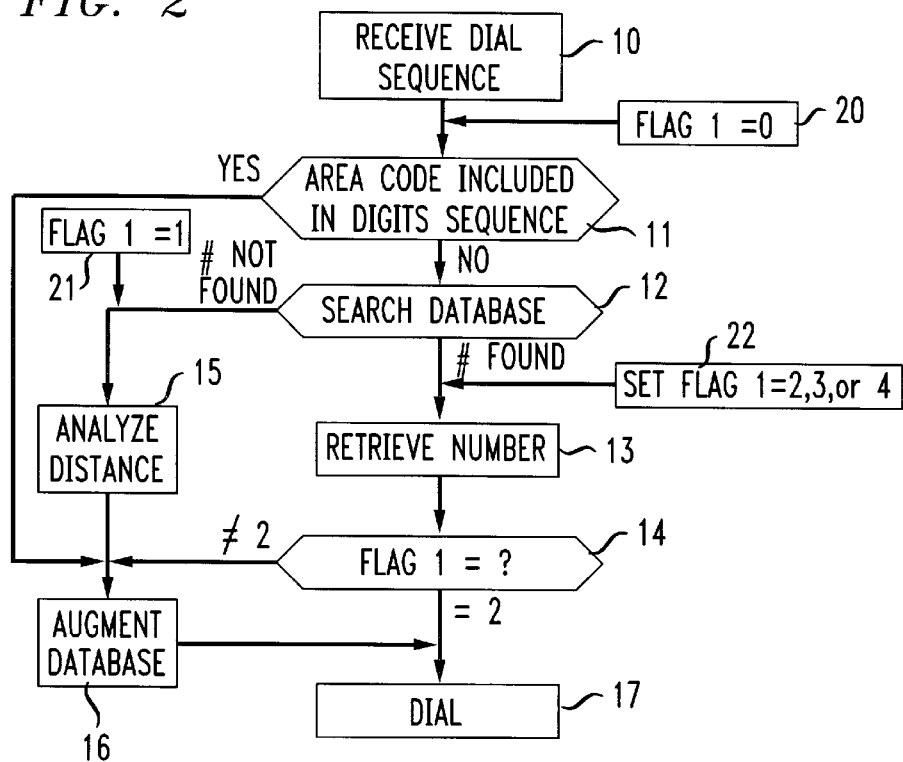
FIG. 2 presents a flow chart of a process that analyzes dialed digits sequences.

FIG. 2 presents a flow chart of the processes carried out in the telephone central office in connection with the principles disclosed herein. The digits dialed by subscriber A are received in block 10, flag 1 is set to 0 in block 20, and control passes to block 11 where the digits sequence is analyzed. When the digits sequence includes an area code designation, control passes to block 16. Otherwise, control passes to block 12. Block 12 searches through the database of numbers called by subscriber A. When the digits sequence is found in the database, control passes to block 13; otherwise, control passes to block 15 which performs a distance analysis. When control passes to block 15, indicating that the digits sequence was not found in the database, flag 1 is set to 1 in block 21. When control passes to block 13, block 22 sets flag 1 to 2, 3, or 4, depending on whether the digits sequence is found in portion A, B, or C of the database, respectively.

The results of the distance analysis in block 15 (the analysis algorithm is described in detail below) is a telephone number (including an area code) which is applied to block 16. In block 13, the number found in the database is retrieved, with the area code included, and control passes to block 14. Block 14 directs the process flow based on the value of the flag 1. When flag 1=2 (i.e., the number is in portion A), control passes to block 17 where the number presented is dialed. Otherwise, control passes to block 16.

Figure 3:
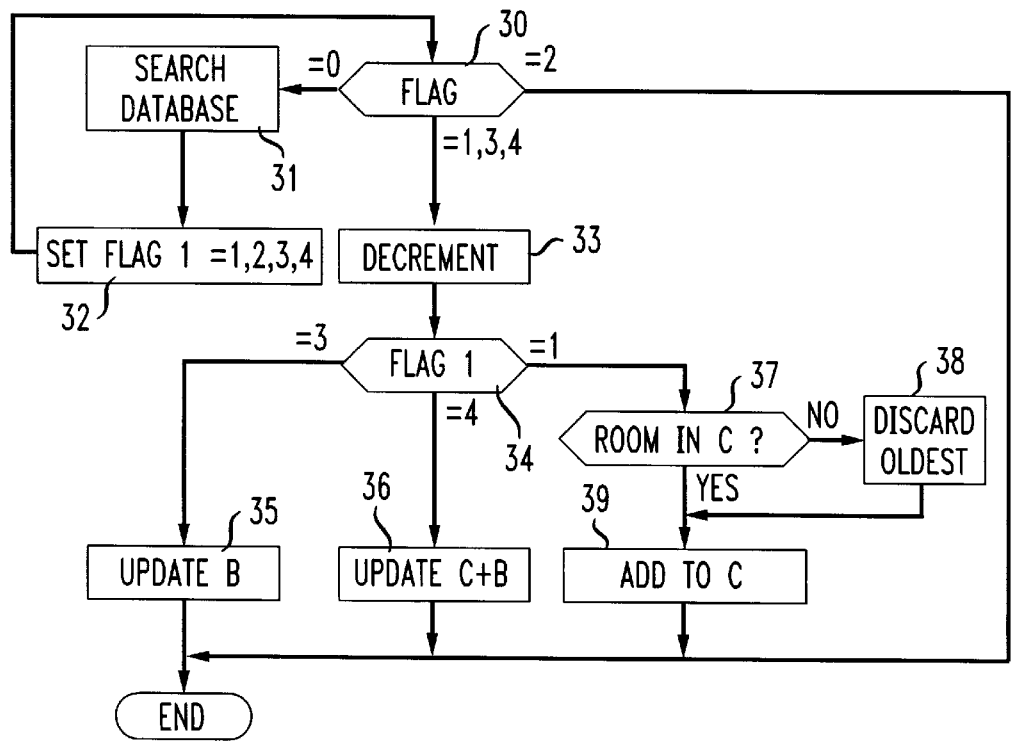
FIG. 3 is a flowchart of an illustrative process that can be employed to effect block 16 of FIG. 2.

Block 16 performs the update on the database. Many different algorithms can be applied to the update process. FIG. 3 is merely illustrative of one acceptable algorithm.

At the outset, it is understood that block 16 is accessed under four different circumstances: a) when the applied number includes an area code and there is no knowledge of whether the number is found in the database (from block 11); b) when it is known that the applied number is not found in the database, but it does include an area code (from block 15); c) when the number is found in portion B of the database (from block 14); and d) when the number is found in portion C of the database (from block 14).

In FIG. 3, block 30 respond to the value of flag 1. When flag 1=0, indicating that block 16 was accessed from block 11, it is known that subscriber A included an area code in the dialed telephone number. Since it is not known whether the dialed number is not also found in the database, block 31 searches the database, and block 32 sets flag 1 based on the results of the search (in the same manner as blocks 20, 21, and 22 set flag 1). Control then returns to block 30. When flag 1=2, indicating that subscriber A dialed a number that is found in portion A of the database, the process ends. When flag 1=1, 3, or 4, control passes to block 33 which decrements the weights in the database entries, and passes control to block 34. The weights are decremented, for example, by multiplying each entry in portions B and C of the database by a factor less than 1 (weights in portion A are not used and, therefore, ignored by block 33).

Block 34 looks at flag 1 and passes control to blocks 35, 36, or 37, depending on whether flag 1=3,4, or 1, respectively. When control passes to block 35, portion B of the database is updated by incrementing the weight of the dialed number. When control passes to block 36, the weight of the dialed number, which is found in portion C is incremented by 1 and then compared to all the weights in portion B. If the weight of the incremented number exceeds the weight of some number in portion B, the incremented number is removed from portion C and placed in portion B in place of the number with the lower weight. This constitutes an update of portions C and B. When control passes to block 37, it is known that the dialed number is new to the database and needs to be inserted in portion C. Accordingly, block 37 ascertains whether there is room in portion C. If there is room, control passes to block 39. Otherwise, block 38 discards the oldest entry and also passes control to block 39. Lastly, block 39 inserts the dialed number into portion C of the database.

The distance analysis operation of block 15 is quite simple. The central office has access to a database of exchanges which specify all relevant exchanges and their location, say in terms of latitude and longitude coordinates of a map. Given the exchange of subscriber A and the exchange dialed by subscriber A, the entry of subscriber A in the exchange-location database as well as all entries that correspond to the dialed exchange are retrieved, and a distance measure is computed. The equation $(X_A-X_1)^2 + (Y_A-Y_1)^2$ is a reasonable measure for making comparisons, where $X_A$ and $Y_A$ are the coordinates of subscriber A's exchange, and $x_1$ and $y_1$ are the coordinates of one of the exchanges found in the exchange-location database that is equal to the dialed exchange.

The distance analysis is helped, of course, by the telephone companies consciously assigning exchanges in area codes so that identical exchanges are geographically far apart from each other; but that is not a difficult problem (e.g., cellular telephony has a similar problem in the assignment of frequencies), and under any circumstance the benefits attained from employing the principles disclosed herein are always realizable.

Once block 12 searches for a match between the number received by block 10 and the numbers residing in the database, there is really no specific limitation that the comparison needs to be one between the 7 digits of the dialed sequence and the last 7 digits of the numbers stored in the database. For example, in present when the central office receives less than 7 digits within a prescribed time period, the connection attempt is abandoned and an error signal is generated. In accordance with the instant disclosure, use of less than 7 digits can be employed to provide an abbreviated dialing feature.

This can be implemented most easily by specifying two "time-out" periods ($t_1$ and $t_2$, where $t_2 > t_1$, by restricting the abbreviated dialing feature to portion A numbers and by, perhaps, adding another field to the database for searching sequences that are less than 7 digits long. In such a setup, after receipt of each digit that is followed by a silent period of more than $t_1$, a search of the abbreviated dialing field is made. If a match if found, the number corresponding to the abbreviated number if retrieved, and the process continues. Otherwise, the wait continues. If a match is not found and another digit followed by an appropriate silent period is received, then the process repeats. If a match is not found and no other digit appears before $t_2$ expires, the dialing attempt is abandoned.

It may be noted that the abbreviated dialing feature can be simplified further by requiring subscribers to use some specific number of digits (e.g., 4) to trigger the feature.

Another enhancement to the search process of block 12 is the "near match" search. Although somewhat more complex than a "perfect match" search, "near match" search algorithms are well known in the art. By way of example, it is noted that most current word processing software includes a spell checker that suggests correct spelling. A variant of such an algorithm will do just fine for the "near match" version of block 12.

It must be recognized that a measure of ambiguity remains and, in a sense, increases when one permits subscribers to mostly avoid using the area code. To avoid being connected to the wrong party, the database kept by the central office can be increased to include the name of the party that corresponds to the telephone number of each entry. With such information stored, it is quite simple to provide subscriber A with an opportunity to confirm his or her selection. That is, after dialing a number without an area code, if that number is stored in the database, block 17 outputs to subscriber A the announcement "John Williams is being called. If that is not the party you wish to reach, press 1". Thereafter, perhaps after a preselected delay, subscriber A would get a ring-back signal, and connection is attempted to the number specified by the above-described process, unless subscriber A pressed 1. In such an event, it is assumed that subscriber A did, indeed, wish to be connected to the dialed number within the local area code. One might even offer subscriber A the option to not be given the announcement when the weight factor is above a certain level. To effect this feature, the weight factor needs to be retrieved in block 13 and forwarded to block 17.

It probably is appreciated by the reader that various enhancements are easily incorporated. For example, subscribers can be given an opportunity to specify what is in the name field of the database (e.g., so that the announcement may state "calling your father", rather than "John Williams is being called"). Also, billing can be affected. That is, subscriber A may be paying a premium for this service, may be allowed a discount for dialing often-used numbers, etc.

We claim:

1. A method for connecting a calling party to a called party via a telecommunication network, comprising the steps of:

receiving a sequence of digits;

determining whether the sequence of digits contains area code digits;

only when the sequence of digits does not include area code digits, analyzing the received digits relative to the calling party to form therefrom a telephone number specification, wherein said analyzing identifies uncertainty stemming from the analysis of the received digits relative to the calling party and resolves said uncertainty, when it occurs, by appending an area code, or refraining from appending an area code; and initiating a process, responsive to said step of analyzing, for connecting the calling party to the called party based on said telephone number specification.

2. The method of claim 1 further comprising a step of generating billing information.

3. The method of claim 1 wherein said analysis determines a telephone number specification that has the highest likelihood of being a telephone number that corresponds to the called party.

4. The method of claim 3 wherein said telephone number specification is derived by considering a database that associates the calling party with a plurality of potential different called parties.

5. The method of claim 4 wherein said database comprises information about previous calls made by the calling party.

6. The method of claim 4 wherein said database comprises information inserted on behalf of the calling party.

7. The method of claim 4 wherein said database comprises information regarding parties called often by the calling party and parties called recently by the calling party.

8. The method of claim 7 further comprising a step of generating billing information that is sensitive to whether the called party is found among the information regarding parties called often by the calling party or among information regarding parties called recently by the calling party.

9. The method of claim 3 wherein said telephone specification is derived by considering a geographical distance between the calling party and parties that are assigned said sequence of digits, but belong to different area codes.

10. The method of claim 3 wherein said telephone number specification is derived by considering a database that associates the calling party with potential different parties, and a geographical distance between the calling party and parties that are assigned said sequence of digits, but belong to different area codes.

11. The method of claim 10 where the database is located in a switch controlled by a service provider to which the calling party is connected.

12. The method of claim 10 where the database is located in a central network database.

13. The method of claim 10 where the database is located in a PBX.

14. The method of claim 1 further including a step of announcing to the calling party said telephone number specification that will be employed in establishing a connection of the calling party to the party with whom the connection will be established.

15. The method of claim 1 further comprising a step of announcing the name of the party with whom a connection with the calling party will be established.

16. The method of claims 14 or 15 wherein the step of announcing includes an invitation to the calling party to direct that a connection not be established to the telephone number specification identified by the step of analyzing.

17. The method of claim 1 wherein the received sequence of digits includes the starting digits of a number that is normally required in the telecommunication network for requesting connection to a called party within the calling party's area code, but less than all of the digits that are normally so required.

18. The method of claim 17 wherein said step of analyzing is responsive to sequences of digits of varying lengths.

19. The method of claim 1 further including a step of announcing to the calling party the telephone number specification that will be employed in establishing a connecting for the calling party when the step of analyzing evaluates a confidence measure and determines that the confidence measure is below a preselected threshold, and establishes said connection without performing said step of announcing when the confidence measure is not below the preselected threshold.

* * * * *